United States Patent
Jeon

(10) Patent No.: US 9,537,828 B2
(45) Date of Patent: Jan. 3, 2017

(54) SECURE MOBILE COMMUNICATION RELAY HAVING FIREWALL FUNCTION

(75) Inventor: In-Young Jeon, Seoul (KR)

(73) Assignee: Young Ok Jun, Seoul (KR)

( * ) Notice: Subject to any disclaimer, the term of this patent is extended or adjusted under 35 U.S.C. 154(b) by 2 days.

(21) Appl. No.: 14/426,165

(22) PCT Filed: Sep. 11, 2012

(86) PCT No.: PCT/KR2012/007294
§ 371 (c)(1),
(2), (4) Date: Mar. 31, 2015

(87) PCT Pub. No.: WO2014/042291
PCT Pub. Date: Mar. 20, 2014

(65) Prior Publication Data
US 2015/0200913 A1    Jul. 16, 2015

(51) Int. Cl.
*H04L 29/06* (2006.01)
*H04W 12/00* (2009.01)
*H04L 12/22* (2006.01)

(52) U.S. Cl.
CPC ........ *H04L 63/0245* (2013.01); *H04L 12/22* (2013.01); *H04L 63/0218* (2013.01); *H04L 63/20* (2013.01); *H04W 12/00* (2013.01)

(58) Field of Classification Search
CPC ............ H04L 63/0209; H04L 63/0227; H04L 63/0245; H04L 63/0281
See application file for complete search history.

(56) References Cited

U.S. PATENT DOCUMENTS

| | | | |
|---|---|---|---|
| 2004/0013112 A1 | 1/2004 | Goldberg et al. | |
| 2004/0039941 A1 | 2/2004 | Schmidt et al. | |
| 2006/0174001 A1* | 8/2006 | Zhu ................. | H04L 63/1416 709/225 |
| 2006/0272013 A1 | 11/2006 | Kilgore | |
| 2009/0175254 A1 | 7/2009 | Kasto et al. | |
| 2010/0050238 A1 | 2/2010 | Fuccello | |

(Continued)

FOREIGN PATENT DOCUMENTS

| | | |
|---|---|---|
| JP | 2008-228064 A | 9/2008 |
| KR | 10-2004-0008171 A | 1/2004 |

(Continued)

OTHER PUBLICATIONS

International Search Report for PCT/KR2012/007294 mailed Feb. 25, 2013 from Korean Intellectual Property Office.

*Primary Examiner* — David Pearson
(74) *Attorney, Agent, or Firm* — Revolution IP, PLLC

(57) ABSTRACT

The secure mobile communication relay of the present invention may comprise: a baseband processing unit for the baseband modulation/demodulation of the mobile communication signal transmitted between a terminal and a mobile communication network base station so as to extract baseband data; a control unit for analyzing the baseband data and permitting or rejecting the relay of the baseband data based on the result of a determination of whether or not a set security policy has been violated; a storage unit for storing information for setting the security policy; and a firewall function unit for determining, based on the instructions of the control unit, whether or not the packet data included in the baseband data violates the security policy.

8 Claims, 3 Drawing Sheets

(56) References Cited

U.S. PATENT DOCUMENTS

| | | | | |
|---|---|---|---|---|
| 2010/0120361 | A1* | 5/2010 | Rappaport | H04B 1/719 |
| | | | | 455/18 |
| 2010/0189013 | A1* | 7/2010 | Bims | H04B 7/022 |
| | | | | 370/254 |
| 2012/0246325 | A1* | 9/2012 | Pancorbo Marcos | H04L 12/2602 |
| | | | | 709/227 |

FOREIGN PATENT DOCUMENTS

| KR | 10-2004-0111612 A | 12/2004 |
|---|---|---|
| KR | 10-2006-0099669 A | 9/2006 |
| KR | 20-0428175 Y1 | 10/2006 |
| KR | 10-2011-0058745 A | 6/2011 |
| KR | 10-2012-0138505 A | 12/2012 |

\* cited by examiner under 35 U.S.C. §371

SECURE MOBILE COMMUNICATION RELAY HAVING FIREWALL FUNCTION

CROSS REFERENCE TO PRIOR APPLICATIONS

This application is a National Stage Application of PCT International Patent Application No. PCT/KR2012/007294 filed on Sep. 11, 2012, under 35 U.S.C. §371, which is hereby incorporated by reference in its entirety.

FIELD OF THE INVENTION

The present invention relates to a mobile communication relay and, more particularly, to a compact (or small-sized) mobile communication relay.

BACKGROUND ART

In the related art, a mobile communication relay, which is mostly used in an indoor environment, where a signal of an external base station cannot be easily received (or detected), in order to provide a mobile communication service in such shadow area, performs a function of emitting a signal of a legally authorized low output level after receiving a signal of a base station or performs a simple signal relaying function of receiving a signal of a mobile communication terminal (or device) and delivering the received signal to the base station.

However, the recent core of mobile communication services and technologies have been shifting from audio services to wireless digital data services, and, in case of data services, shifting is being made from 3G services to 4G services, thereby evolving to a state allowing transmission to be realized with stability and at a high rate.

Additionally, with the rapid and extensive supply of smart phones, which are constantly connected to a communication network, and which are capable of processing advanced work tasks, classified information may be instantaneously leaked through the smart phone and the mobile communication, and, conversely, the possibility of malicious codes infiltrating into corporate networks via smart phones cannot be ruled out.

In such wireless environment, security systems, which are built within a company (or corporate organization) only for office computers and hardware used in internal networks, are vulnerable to the leakage of classified corporate information or security breach and to the spreading of malicious codes through smart phones and mobile communication services.

DETAILED DESCRIPTION OF THE INVENTION

Technical Objects

An object that is to be resolved by the present invention is to provide a secure mobile communication relay having a firewall function, which is capable of providing security functions while relaying signals between a mobile communication terminal, which is located indoors, and an external base station.

Technical Solutions

A secure mobile communication relay according to an aspect of the present invention may include a baseband processing unit for the baseband modulation/demodulation of the mobile communication signal transmitted between a terminal and a mobile communication network base station so as to extract baseband data;

a control unit for analyzing the baseband data and permitting or rejecting the relay of the baseband data based on the result of a determination of whether or not a set security policy has been violated;

a storage unit for storing information for setting the security policy; and a firewall function unit for determining, based on the instructions of the control unit, whether or not the packet data included in the baseband data violates the security policy.

According to the exemplary embodiment, the storage unit may further store firewall selection information designating through which one of the firewall function unit and an external firewall equipment the determination of whether or not a set security policy has been violated is to be performed, and the control unit may operate so as to provide the packet data to at least one of the firewall function unit and the external firewall equipment, in accordance with the firewall selection information.

According to the exemplary embodiment, in case the security policy is set up to not permit a wireless packet data service, the control unit may operate to transmit a service option negotiation rejection signal to the terminal, when the baseband data received from the terminal includes a service option negotiation request signal.

According to the exemplary embodiment, if the packet data is determined to be violating the security policy, the control unit may operate so as to transmit a PDP context deactivation request signal to the terminal.

According to the exemplary embodiment, the control unit may store an identification number of the terminal when the terminal requests for a service option negotiation request, and wherein, if the packet data is determined to be violating the security policy, the control unit operates so as to transmit the PDP context deactivation request signal to the terminal based upon the stored identification number of the terminal.

According to the exemplary embodiment, if the packet data is determined to be violating the security policy, the control unit may operate so as to transmit the PDP context deactivation request signal to the mobile communication network base station.

In a secure mobile communication relaying method using a secure relay relaying a mobile communication signal between a terminal and a mobile communication network base station according to another aspect of the present invention, the secure relay may include a step of storing information for setting a security policy;

a step of acquiring a result of a determination of whether or not a set security policy has been violated with respect to packet data included in the baseband data, wherein the baseband data are acquired by performing baseband modulation/demodulation on the mobile communication signal; and a step of permitting relay of the baseband data only when the data is determined not to be violating the security policy.

According to the exemplary embodiment, the method may further include a step of storing firewall selection information designating through which one of the firewall function unit embedded in the secure relay and an external firewall equipment the determination of whether or not a set security policy has been violated is to be performed; and a step of providing the packet data to at least one of the firewall function unit and the external firewall equipment, in accordance with the firewall selection information.

According to the exemplary embodiment, the method may further include a step of transmitting a service option negotiation rejection signal to the terminal, when the baseband data received from the terminal includes a service option negotiation request signal, in case the security policy is set up to not permit a wireless packet data service.

According to the exemplary embodiment, the method may further include a step of transmitting a PDP context deactivation request signal to the terminal, if the packet data is determined to be violating the security policy.

According to the exemplary embodiment, the method may further include a step of storing an identification number of the terminal when the terminal requests for a service option negotiation request; and a step of transmitting the PDP context deactivation request signal to the terminal based upon the stored identification number of the terminal, if the packet data is determined to be violating the security policy.

According to the exemplary embodiment, the method may further include a step of transmitting the PDP context deactivation request signal to the mobile communication network base station, if the packet data is determined to be violating the security policy.

Effects of the Invention

According to the secure mobile communication relay of the present invention, when providing a wireless data service respective to a mobile communication terminal in an area that required security, commencement (or initiation) and termination of the service and a relaying of packets may be controlled (or regulated).

According to the secure mobile communication relay of the present invention, security may be provided when providing a wireless data service by using a conventional (or legacy) firewall equipment.

Additionally, according to the secure mobile communication relay of the present invention, in case there is any activity that violates the security policy, communication overhead (or communication load) may reduced by transmitting a cancel connection message (or deactivate connection message) to each of the mobile communication terminal and the server between which communication was being performed.

Furthermore, according to the secure mobile communication relay of the present invention, since security may be provided by using the conventional protocol without any changes, a pre-decided security policy may be applied even in case of tethering, which is attempted by a general mobile phone terminal (or device) being referred to as a feature phone, a smart phone, as well as a PC.

MODE FOR CARRYING OUT THE PRESENT INVENTION

Figure 1:
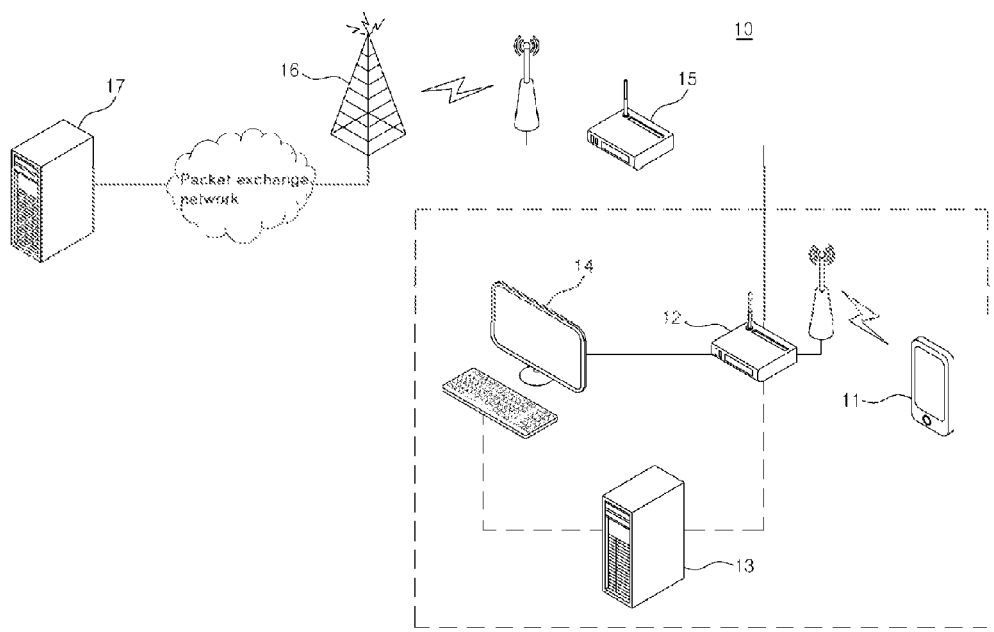
FIG. 1 illustrates a conceptual view of a mobile communication system using a secure mobile communication relay having a firewall function according to an exemplary embodiment of the present invention.

Specific structural and functional descriptions on the exemplary embodiments of the present invention that are disclosed in this document are merely exemplary descriptions that are provided in order to described the exemplary embodiments of the present invention, and, therefore, the exemplary embodiments of the present invention may be executed and realized in diverse formats and should not be interpreted as being limited only to the exemplary embodiments described in this document.

Hereinafter, preferred embodiments of the present invention will be described in more detail with reference to the accompanying drawings. Identical reference numerals will be used for identical components shown in the drawings, and repeated description of identical components will be omitted.

FIG. 1 illustrates a conceptual view of a mobile communication system using a secure mobile communication relay having a firewall function according to an exemplary embodiment of the present invention.

Referring to FIG. 1, a mobile communication system (10) may be described with a mobile communication terminal (11), a secure mobile communication relay (12), an external firewall equipment (13), a firewall management server (14), an external mobile communication relay (15), a base station (16), and an application server (17).

In a location that requires a security service, such as an office, a secure mobile communication relay (hereinafter referred to as a secure relay) (12) having a firewall function is installed, and, in this case, secure relates (12) are installed so that mobile communication services can be provided only through such secure relay (12).

For example, since the mobile communication terminal (11) generally selects a base station having the highest intensity level of the mobile communication radio wave that is being received, if a signal of a secure relay (12) within the office is stronger (or more intense) than a signal of an external base station (16), the mobile communication terminal (11) accesses only the secure relay (12).

The mobile communication terminal (11) may include a smart phone, a general mobile phone, a tablet PC, a PDA, and so on, and a computer that seeks to use a wireless data service via tethering with such terminal may also be included in this range.

The mobile communication terminal (11) is connected to the external mobile communication relay (15) and the base station (16) by passing through the secure relay (12), and, then, the mobile communication terminal (11) may access an application server (17) providing an actual internet service, such as a web service, by passing through a mobile communication packet exchange network, which is represented by the base station (16).

At this point, the external mobile communication relay (15) performs a function of establishing a simple connection between the secure relay (12), which performs a function of an in-door (or interior) signal relay, and the external base station (16). The secure relay (12) and the external mobile communication relay (15) may be connected via wired connection, for example, through an optical cable.

The external firewall equipment (13) corresponds to an optional component, and the secure relay (12) may apply the security policy by operating at least any one of an internal firewall function unit and the external firewall equipment (13), both being capable of providing firewall functions by themselves.

The firewall management server (14) may set up (or configure) and manage a security policy of the firewall function unit within the external firewall equipment (13) or the secure relay (12).

The secure relay (12) may execute a detailed security policy respective to a transmitted wireless data packet, by extracting terminal identification information and IP information from information that has been exchanged in order to allow the mobile communication terminal (11) to access the application server (17) by passing through the mobile communication base station (16) and storing the extracted information, and by rejecting the transmission itself of the wireless data packet at the very beginning in accordance with the security policy, which has been set up by an operation manager through the firewall management server (14), or by operating an internally equipped firewall function or the external firewall equipment (13).

Furthermore, in case the wireless data packet violates the security policy, the secure relay (12) may not only reject the transmission of the corresponding packet but may also send a signal requesting for access cancellation (e.g., deactivation of PDP context information) to each of the mobile communication terminal (11) and the base station (16), thereby being capable of terminating (or ending) the respective wireless packet data service.

Figure 2:
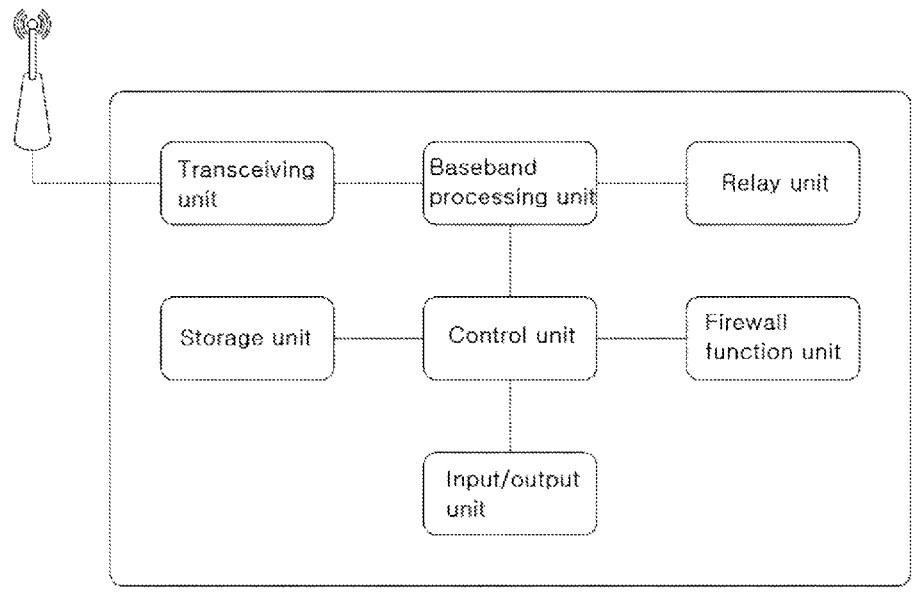
FIG. 2 illustrates a block view showing a general example of the secure mobile communication relay having a firewall function according to an exemplary embodiment of the present invention.

FIG. 2 illustrates a block view showing a general example of the secure mobile communication relay having a firewall function according to an exemplary embodiment of the present invention.

Referring to FIG. 2, the secure mobile communication relay (12) may include an antenna (121), a transceiving unit (122), a baseband processing unit (123), a control unit (124), a relay unit (125), a storage unit (126), a firewall function unit (127), and an input/output unit (128).

First of all, a mobile communication signal is received between the secure relay (12) and the terminal (11) accessing the secure relay (12) by passing through the antenna (121) and the transceiving unit (122), and, then, after being downward modulated to a baseband signal, the signal is processed as any one of audio communication and data communication by the baseband processing unit (123).

The data packet is delivered to the external relay (15) after passing through the control unit (124) and the relay unit (125) and is then delivered to the application server (17) by passing through the base station (16).

Herein, in case the secure relay (12) is connected to the external relay (15) through an optical cable, the relay unit (125) may be implemented as an optical input/output port. And, in case the secure relay (12) is connected to the external relay (15) via wireless connection, the relay unit (125) may be implemented as a wireless transceiver, and, in this case, the wireless transceiver may be implemented separately from the antenna (121) and the transceiving unit (122) or may also be implemented to share a predetermined portion of the antenna (121) and the transceiving unit (122).

The control unit (124) may decide whether or not to apply a security policy to the data packet by referring to security policy set-up information and firewall selection information, which are stored in the storage unit (126), and the control unit (124) may also decide whether or not to determine by which one of the internal firewall function unit (127) and the external firewall equipment (13) the security policy has been violated.

In order to do so, the control unit (124) analyzes the data packet, which is transmitted from the mobile communication terminal (11) and acquires each of an identification information (e.g., phone number, ENS, IMEI, SIM, MSN, PIN, and so on) of the terminal (11) and IP information assigned to the terminal (11) as well as IP information of the application server (17), which corresponds to the destination of the transmitted packet, and, then, the control unit (124) stores such information in the storage unit (126).

Additionally, the control unit (124) may store security policy set-up information, which is designated by the firewall management server (14), in the storage unit (126). At this point, the security policy may be set up differently in accordance with the number or identification information of the terminal.

In case the security policy is set up to be applied by the firewall management server (14), and in case the internal firewall function unit (127) is configured to be used, the firewall function unit (127) analyzes the packet that is being transmitted between the terminal (11) and the application server (17) in accordance with the designated security policy and determines whether the analyzed packet is adequate for the security policy or whether the packet violates the security policy.

In case the firewall function unit (127) determines that the transmitted packet violates the security policy, the control unit (124) refers to the identification information of the corresponding terminal (11) and the IP information of the application server (17) and, then, the control unit (124) generates signals for deactivating (or cancelling) the PDP context and for terminating the access with respect to each information and transmits the generated signals to the terminal (11) and the application server (17), and, then, by discarding (or deleting) the corresponding packet instead of delivering the corresponding packet to the relay unit (125), the control unit (124) may perform control operations that can prevent relay operations from being performed.

The input/output unit (128) allows the firewall management server (14) to access the secure relay (12) and to set up diverse security policies. Additionally, the input/output unit (128) may communicate with respect to the external firewall equipment (13) so that the control unit (124) can request for an analysis of the packet through the input/output unit (128).

Figure 3:
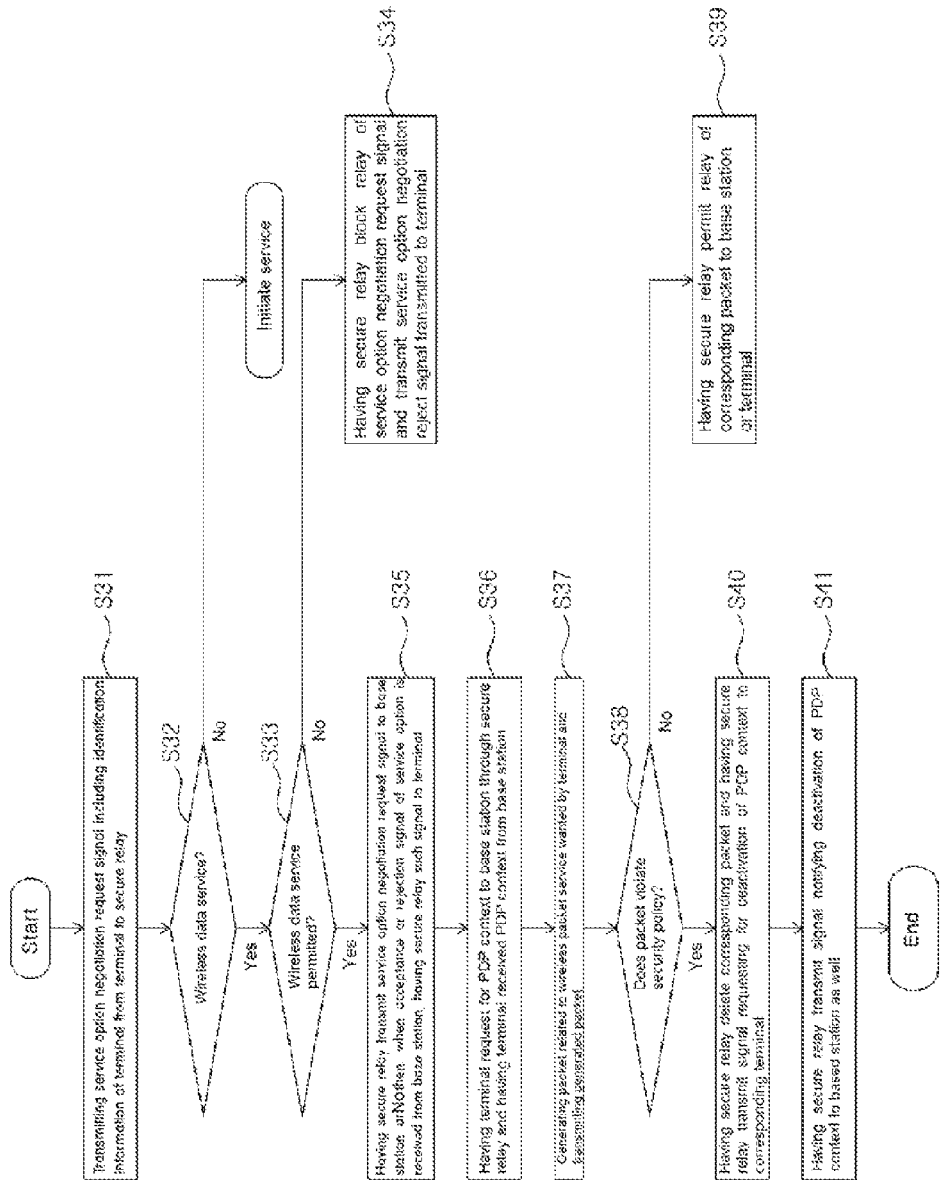
FIG. 3 illustrates a flow chart showing an exemplary message flow of the secure mobile communication relay having a firewall function according to an exemplary embodiment of the present invention.

FIG. 3 illustrates a flow chart showing an exemplary message flow of the secure mobile communication relay having a firewall function according to an exemplary embodiment of the present invention, and, as an example, the message flow is based upon a service option negotiation, which is realized between the terminal and a network base station in the 3GPP2 standard (or specification).

A process of realizing a service option negotiation firsthand with respect to which service is to be used between the terminal and the base station, when the mobile communication terminal initiates a wireless mobile communication service, is specified in TIA: TSB 58 of the 3GPP2 standard.

Although service options are expanding along with the evolution of the mobile technology, depending upon some of the network equipments, a specific service may not be provided. In order to take measures against such failure to provide specific services, a service option negotiation regulates a procedure for performing a negotiation between the terminal and the base station prior to initiating a service.

Service option negotiation corresponds to a procedure of sending out inquiries and receiving respective responses on the intentions of a subject requesting for a specific service for using the requested service and on whether a counterpart (or opposite) device or intermediary equipment is capable of providing such service.

Referring to FIG. 3, first of all, in step (S31), in order to establish a data transmission path between a terminal (11), which is within an operation range of a secure relay (12), and a specific application server (17), the user transmits a service option negotiation request signal (Service_Option_Request signal) including identification information of the terminal (11) to the secure relay (12).

In step (S32), while the secure relay (12) stores identification information of the terminal (11), the secure relay (12) determines whether or not the service requested by the terminal (11) corresponds to a wireless data service. For example, instead of corresponding to a wireless data service, in case the requested service corresponds to an audio service or a short message service, the corresponding service is permitted (or authorized), and the terminal (11) is connected to the base station (16).

In case the requested service corresponds to a wireless data service, in step (S33), the secure relay (12) refers to the set security policy and determines whether or not the wireless data service is being permitted.

Based upon the security policy, in case the wireless data service is in a non-permitted state, in step (S34), the secure relay (12) blocks the relay of the service option negotiation request and, then, the secure relay (12) sends a signal rejecting the service option negotiation (Service_Option_Reject) to the terminal (11). In this case, the terminal (11) indicates that the wireless data service cannot be used and terminates all access attempts.

Based upon the security policy, in case the wireless data service is permitted, in step (S35), the secure relay (12) sends a service option negotiation request signal to the base station (16), and, then, when an acceptance signal of the service option (Service_Option_Accept) or rejection signal is received from the base station (16), this is directly related to the terminal (11) by the secure relay (12).

In step (S36), the terminal (11) receiving an acceptance of the service requests for PDP context to the base station (16) through the secure relay (12), in order to enable the PDP context (Packet Data Protocol context), which corresponds to a group of information for using diverse types of packet data services, to be acquired, and, then, the terminal (11) receives the PDP context from the base station (16). The PDP context may include parameters, such as PDP types (IP or PPP), PDP addresses and related types, QoS profiles, certifications, DNS, and so on. Through the procedure of receiving PDP context information, the terminal (11) may be assigned with an IP address and may be capable of setting up a QoS.

Accordingly, the terminal (11) is in a state of having completed preparations for using the packet service, which was actually intended to be used, and, in step (S37), the terminal (11) generates a packet related to the wanted wireless packet service and transmits the generated packet.

In step (S38), according to its settings, the secure relay (12) analyzes the packet being received from the terminal (11) or the application server (17) by using any one of the internal firewall function unit (127) or the external firewall equipment (13), and, then, the secure relay (12) determines whether or not the received packet violates the security policy.

In step (S39), in case the packet does not violate the security policy, the secure relay (12) permits (or allows) the relay of the corresponding packet to the base station (16) or the terminal (11).

In step (S40), in case it is determined that the packet is violating the security policy, the secure relay (12) discards (or deletes) the corresponding packet, and, furthermore, in order to execute a forced termination of the corresponding wireless packet service, the secure relay (12) refers to the identification information of the terminal (11), which has been stored earlier, and then transmits a signal requesting for a deactivation of the PDP context (Deactivate_PDP_Context_Request) to the corresponding terminal (11).

Although packet data services are no longer available due to this step (S40), whenever required, for example, in case the application server (17) to which the terminal (11) is accessing is waiting for the reception of a packet, or in case the server (17) is continuously transmitting malicious codes, in step (S41), the secure relay (12) also transmits a signal notifying the deactivation of the PDP context (Deactivate_PDP_Context_Request) to the base station (16).

As described above, although the present invention has been described based upon a limited set of exemplary embodiments and drawings, the present invention will not be limited only to the abode-described exemplary embodiments, and, therefore, diverse amendments and modifications may be realized from this description by anyone skilled in the field to which the present invention belongs. Therefore, it should be understood that the spirit of the present invention shall be determined based only upon the appended claims that will be specified as follows, and it should also be understood that all identical or equivalent modifications belong to the scope of the spirit of the present invention.

INDUSTRIAL APPLICABILITY

The present invention may be applied to diverse types of communication relays.

What is claimed is:
1. A secure mobile communication relay, comprising:
one or more units stored in memory, configured and executed by a hardware processor using an algorithm, the algorithm which when executed, causing the processor to perform the one or more units, the one or more units comprising:
a baseband processing unit for the baseband modulation/demodulation of the mobile communication signal transmitted between a terminal and a mobile communication network base station so as to extract baseband data;
a control unit for determining whether or not a set security policy has been violated, the determination being performed by analyzing the baseband data and the control unit for determining whether to permit or reject the relay of the baseband data based on the determination;
a storage unit for storing information for setting the security policy; and
a firewall function unit for determining, based on instructions of the control unit, whether or not the packet data included in the baseband data violates the security policy, wherein
in response to determination of the packet data to be violating the security policy, the control unit operates to transmit a PDP context deactivation request signal to the terminal and the mobile communication network base station.

2. The secure mobile communication relay of claim 1, wherein the storage unit further stores firewall selection information designating through which one of the firewall function unit and an external firewall equipment the determination of whether or not a set security policy has been violated is to be performed, and
 wherein the control unit operates so as to provide the packet data to at least one of the firewall function unit and the external firewall equipment, in accordance with the firewall selection information.

3. The secure mobile communication relay of claim 1, wherein, in case the security policy is set up to not permit a wireless packet data service, the control unit operates to transmit a service option negotiation rejection signal to the terminal, when the baseband data received from the terminal includes a service option negotiation request signal.

4. The secure mobile communication relay of claim 1, wherein the control unit stores an identification number of the terminal when the terminal requests for a service option negotiation request, and wherein, if the packet data is determined to be violating the security policy, the control unit operates so as to transmit the PDP context deactivation rec signal to the terminal based upon the stored identification number of the terminal.

5. In a secure mobile communication relaying method using a secure relay relaying a mobile communication signal between a terminal and a mobile communication network base station, the secure relay comprises:
 storing information for setting a security policy;
 acquiring a result of a determination of whether or not a set security policy has been violated with respect to packet data included in the baseband data, wherein the baseband data are acquired by performing baseband modulation/demodulation on the mobile communication signal;
 permitting relay of the baseband data in response to determination of the data not to be violating the security policy; and
 in response to determination of the packet data to be violating the security policy, transmitting a PDP context deactivation request signal to the terminal and the mobile communication network base station.

6. The method of claim 5, further comprising:
 storing firewall selection information designating through which one of the firewall function unit embedded in the secure relay and an external firewall equipment the determination of whether or not a set security policy has been violated is to be performed; and
 providing the packet data to at least one of the firewall function unit and the external firewall equipment, in accordance with the firewall selection information.

7. The method of claim 5, further comprising:
 transmitting a service option negotiation rejection signal to the terminal, when the baseband data received from the terminal includes a service option negotiation request signal, in case the security policy is set up to not permit a wireless packet data service.

8. The method of claim 5, further comprising:
 storing an identification number of the terminal when the terminal requests f a service option negotiation request; and
 transmitting the PDP context deactivation request signal to the terminal based upon the stored identification number of the terminal, if the packet data is determined to violating the security policy.

* * * * *